(12) United States Patent
Jeng et al.

(10) Patent No.: US 9,581,434 B2
(45) Date of Patent: Feb. 28, 2017

(54) APPARATUS AND METHOD FOR MEASURING PATTERN OF A GRATING DEVICE

(71) Applicant: National Taiwan University of Science and Technology, Taipei (TW)

(72) Inventors: Jeng-Ywan Jeng, Taipei (TW); Mohammad Hossein Goudarzi Khouygani, Taipei (TW); Meng-Jyun Lin, Taipei (TW)

(73) Assignee: NATIONAL TAIWAN UNIVERSITY OF SCIENCE AND TECHNOLOGY, Taipei (TW)

( * ) Notice: Subject to any disclaimer, the term of this patent is extended or adjusted under 35 U.S.C. 154(b) by 0 days.

(21) Appl. No.: 14/755,743

(22) Filed: Jun. 30, 2015

(65) Prior Publication Data
US 2017/0003117 A1    Jan. 5, 2017

(51) Int. Cl.
G01B 11/24    (2006.01)
G01B 11/14    (2006.01)

(52) U.S. Cl.
CPC .................... G01B 11/14 (2013.01)

(58) Field of Classification Search
CPC ........ G01D 5/00; H04N 2201/00; H04N 1/00; F21V 9/00; F21V 5/00
USPC .............................. 356/237.2–237.6, 601–614
See application file for complete search history.

(56) References Cited

U.S. PATENT DOCUMENTS

| | | | | |
|---|---|---|---|---|
| 6,552,810 | B1* | 4/2003 | Hermann | G01D 5/36 250/237 G |
| 2011/0102793 | A1* | 5/2011 | Straaijer | G01B 11/0641 356/369 |
| 2011/0273725 | A1* | 11/2011 | Milvich | G01D 5/34715 356/616 |
| 2011/0304482 | A1* | 12/2011 | Kapner | G01D 5/24476 341/13 |
| 2012/0154805 | A1* | 6/2012 | Holzapfel | G01D 5/38 356/365 |
| 2013/0120763 | A1* | 5/2013 | Grenet | G01C 3/085 356/615 |

* cited by examiner

Primary Examiner — Tarifur Chowdhury
Assistant Examiner — Isiaka Akanbi
(74) Attorney, Agent, or Firm — WPAT, PC; Justin King

(57) ABSTRACT

An apparatus for measuring pattern of a grating device is provided. In an embodiment, the apparatus comprises a light source unit, an image unit, a processing unit, and a movement unit. The light source unit irradiates to a surface of the grating device. The image unit acquires a plurality of first digital images including an image on the surface of the grating device and images due to Talbot effect between the surface and a first position with respect to the grating device. The image unit acquires a plurality of second digital images due to Talbot effect at a second position determined based on the first digital images when the movement unit produces a relative movement between the image unit and grating device. Based on the acquired digital images, analysis, inspection on the grating device, or comparison of the grating device with a reference grating scale, can be implemented optionally.

13 Claims, 9 Drawing Sheets

APPARATUS AND METHOD FOR MEASURING PATTERN OF A GRATING DEVICE

TECHNICAL FIELD

The present invention relates generally to measurement of a grating device and, more particularly, to an apparatus and a method for measuring pattern of a grating device.

BACKGROUND

Conventionally, optical grating devices, such as linear scales or encoders, are measured using methods, such as scanning probe method (SPM) and optical diffraction effect (OD) by laser light sources.

The scanning probe methods such as Scanning Electron Microscopy (SEM), Atomic Force Microscope (AFM) are complex and require specific conditions for operation. For example, SEM can observe and measure the grating pattern in nano-scale but it is destructive test method. In addition, vacuum is required for operation of SEM. This method is not suitable to implement as an online test method and cannot measure a large linear scale. For another example, AFM can measure a small area usually under 100 um$\lambda$100 um but cannot measure large linear scale.

For the optical diffraction methods, the pitch of the grating device can be determined by the aid of laser diffraction in Littrow condition. This method can measure pitch of grating scale very precisely. However, this method utilizes laser as its light source and cannot determine exactly which pitch has error.

For the foregoing reasons, there is a need for an apparatus which can measure pattern of grating devices in different sizes or length, effectively, efficiently, and flexibly.

SUMMARY

Embodiments of the disclosure provide an apparatus and a method for measuring pattern of a grating device. The apparatus can measure the quality of grating devices by using different light source, e.g., a low price light source such as LED, and the apparatus can be configured to measure a grating device such as a linear scale in arbitrary length. In addition, the apparatus can be configured to find error of each line of grating immediately and thus can be implemented as, or embedded into, a piece of pattern measurement equipment, or an online quality control (QC) machine in production line of scale making (e.g., imprinting, printing or laser direct writing).

According to a first aspect of the invention, an apparatus for measuring pattern of a grating device is provided. In an embodiment of the first aspect, the apparatus comprises a light source unit, an image unit, a processing unit, and a movement unit. The light source unit irradiates to a surface of the grating device. The image unit acquires images with respect to the grating device. The processing unit, coupled to the image unit, controls the image unit to acquire the images. The movement unit produces relative movements between the image unit and the grating device. The image unit acquires a plurality of first digital images including an image on the surface of the grating device and images due to Talbot effect between the surface and a first position with respect to the grating device. The processing unit determines a second position based on the first digital images. The image unit acquires a plurality of second digital images due to the Talbot effect at the second position with respect to the grating device when the movement unit produces a relative movement between the image unit and the grating device.

According to a second aspect of the invention, a method for measuring pattern of a grating device is provided. In an embodiment of the second aspect, the method includes the following steps. A beam is irradiated to a surface of the grating device. A plurality of first digital images including an image on the surface of the grating device and images due to Talbot effect between the surface and a first position with respect to the grating device are acquired by an image unit. A second position is determined based on the first digital images. A plurality of second digital images due to the Talbot effect at the second position with respect to the grating device are acquired by the image unit when a relative movement is produced between the image unit and the grating device.

According to a third aspect of the invention, a method to improve the quality of the images (such as the first digital images), wherein a transparent grating device (or called a second grating device) is disposed additionally between the light source unit and the grating device to be measured. In an embodiment of the third aspect, the method includes the following steps. A beam passes through a transparent grating device to a surface of the grating device. The beam irradiates to the grating device and then reflected to the transparent grating device so that the imaging unit can acquire a plurality of first digital images.

Based on the acquired digital images, analysis, inspection on the grating device, and comparison of the grating device with a reference grating scale, can be implemented optionally.

BRIEF DESCRIPTION OF THE DRAWINGS

These and other features, aspects, and advantages of the present invention will become better understood with regard to the following description and accompanying drawings where.

DETAILED DESCRIPTION

Figure 1:
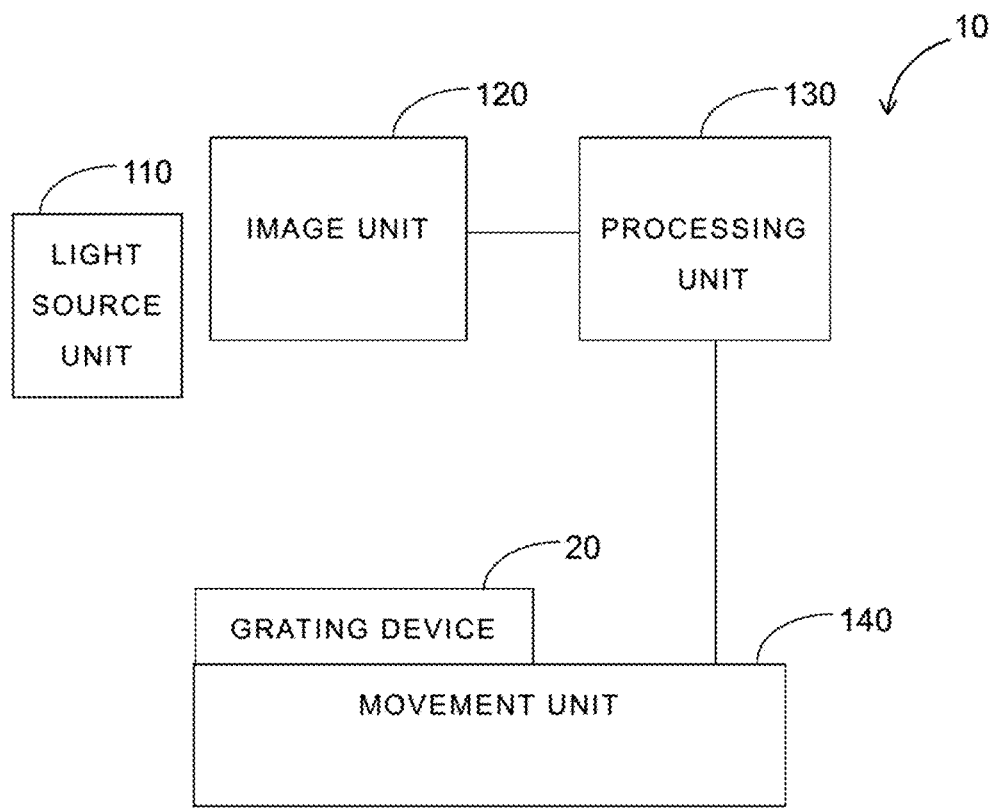
FIG. 1 illustrates an apparatus for measuring pattern of a grating device, according to a first embodiment.

FIG. 1 illustrates an apparatus for measuring pattern of a grating device, according to a first embodiment. The apparatus 10 measures pattern of a grating device 20 by using Talbot effect. The apparatus 10 can be configured to measure arbitrary length of linear scale, and can be configured to find error of each line of grating immediately.

In FIG. 1, the apparatus 10 includes a light source unit 110, an image unit 120, a processing unit 130, and a movement unit 140. The light source unit 110 is applied to irradiate to a surface of the grating device 20. The image unit 120 is utilized for acquiring images according to Talbot effect with respect to the grating device 20. The processing unit 130, coupled to the image unit 120, is utilized for controlling the image unit 120 and the movement unit 140. The movement unit 140, such as a motorized stage or any mechanical device for producing movement in one or two dimensions, is utilized for producing relative movements between the image unit 120 and the grating device 20, e.g., moving only one of the image unit 120 and the grating device 20, or moving both of them.

For example, the light source unit 110 includes a laser or a LED light source device, or can be any type light device providing collimated light such as laser or LED with collimating lens. The collimated light irradiated to the grating device 20 and reflected light will generate images of the grating, according to the Talbot effect. The image of the grating is repeated at regular distances away from the surface of the grating device 20. The regular distance is called the Talbot length $Z_T$, and the repeated images are called self-images of Talbot images. The distance between first self-image and the surface of the grating device 20 is called first self-image distance, which is equal to the Talbot length $Z_T$. In addition, at a half of the Talbot length, a self-image also occurs, but phase-shifted by half of the pitch of the grating device, where the physical meaning of this is that it is laterally shifted by half the width of the grating pitch.

For measuring the pattern of the grating device 20, the processing unit 130 controls the image unit 120 and the movement unit 140 so that images due to the Talbot effect are acquired with respect to the grating device 20. Based on the acquired images, inspection of the grating device 20, or comparison of the grating device 20 with a reference grating scale, can be optionally implemented.

For example, the image unit 120 acquires a plurality of first digital images including an image on the surface of the grating device and images due to Talbot effect between the surface and a first position with respect to the grating device 20. The processing unit 130 can then determine a second position based on the first digital images. The first digital images can be used for determining the first self-image distance, i.e. the Talbot length $Z_T$, according to the Talbot effect. For example, the second position may be equal to a position at a distance of the Talbot length $Z_T$, a half of the Talbot length $Z_T$, or m*$Z_T$, which m is a positive integer, above the surface of the grating device 20. The image unit 120 further acquires a plurality of second digital images due to the Talbot effect at the second position with respect to the grating device 20 when the movement unit 140 produces a relative movement between the image unit 120 and the grating device. In an example, the movement unit 140 produces the relative movement in a direction perpendicular to fringes of the grating device 20 in order for the image unit to acquire the second digital images.

When the relative movement of this example is performed, the fringes will relatively move and the intensity of light sensed by each pixel of an image sensing device of the image unit 120 will change in a manner similar to a sinusoidal curve. For example, the intensity changes for a pixel of the sensing device can be represented by a curve, wherein the period of the curve corresponds to pitch of the fringes and the amplitude of the curve corresponds to maximum intensity of light that it can pass.

By comparing this curve and reference data (e.g., reference data obtained by a reference scale, another grating device, or grating requirement), it is possible to measure and calibrate the scale of the grating device 20. For example, the processing unit 120 of the apparatus 10 can further generate comparison information based on the second digital images and the reference data. In some examples, the processing unit 130 can be realized by using a dedicated electronic circuit, embedded system, application specific integrated circuit (ASIC), digital signal processing (DSP) circuit, a processing circuit, and/or a computer system (such as a desktop computer, notebook computer, tablet computer, or smart device), but the invention is not limited thereto. In further example, the apparatus 10 can further include a display unit (e.g., a display panel, or a touch panel display), coupled to the processing unit, for presenting the comparison information graphically or numerically. In some examples, the processing unit 130 and the display unit can be realized by using a computer system, such as a desktop computer, notebook computer, tablet computer, or smart device (e.g., smart phone).

In addition, different configuration of the image unit 120, the processing unit 130, and the movement unit 140 can be employed to acquire the first digital images and the second digital images. In one example, the movement unit 140 includes a mechanism for producing two-dimensional movement between the image unit 120 and the grating device 20. In this example, the movement unit 140 is configured to produce a relative movement between the image unit 120 and the grating device 20 in a first direction, e.g., perpendicular to the surface of the grating device 20, so that the image unit 120 can acquire the first digital images due to the Talbot effect. In addition, the movement unit 140 is configured to produce a relative movement between the image unit 120 and the grating device 20 in a second direction, e.g., perpendicular to the fringes of the grating device 20, in order for the image unit 120 to acquire the second digital images due to the Talbot effect. Besides, the processing unit 130 can be configured to control the image unit 120 and the movement unit 140 for the acquisition of the first images and determine the second position based on the first digital images, e.g., by using the first digital images and corresponding positional information about the relative movement produced by the movement unit 140.

In another example, the image unit 120 is configured to provide fine focus control, and the movement unit 140 can be implemented by using a mechanism for producing one dimensional movement between the image unit 120 and the grating device 20. In this example, the image unit 120 acquires the first digital images due to the Talbot effect with respect to the grating device 20 when the image unit 120 is changing the focus between the surface of the grating device 20 and the first position while the grating device 20 is not moving. In this example, the image unit 120 may include an imaging device with a focus controller, which provides fine adjustment of the focus of the imaging device and provides positional information for the focus. In addition, the processing unit 130 can be configured to control such image unit 120 and determine the second position based on the first digital images, e.g., by using the first digital images and the positional information corresponding to the first digital images.

Further, the apparatus 10 can be implemented as, or embedded into, a piece of pattern measurement equipment, or an online quality control (QC) machine in production line of scale making (e.g., imprinting, printing or laser direct writing).

Figure 2:
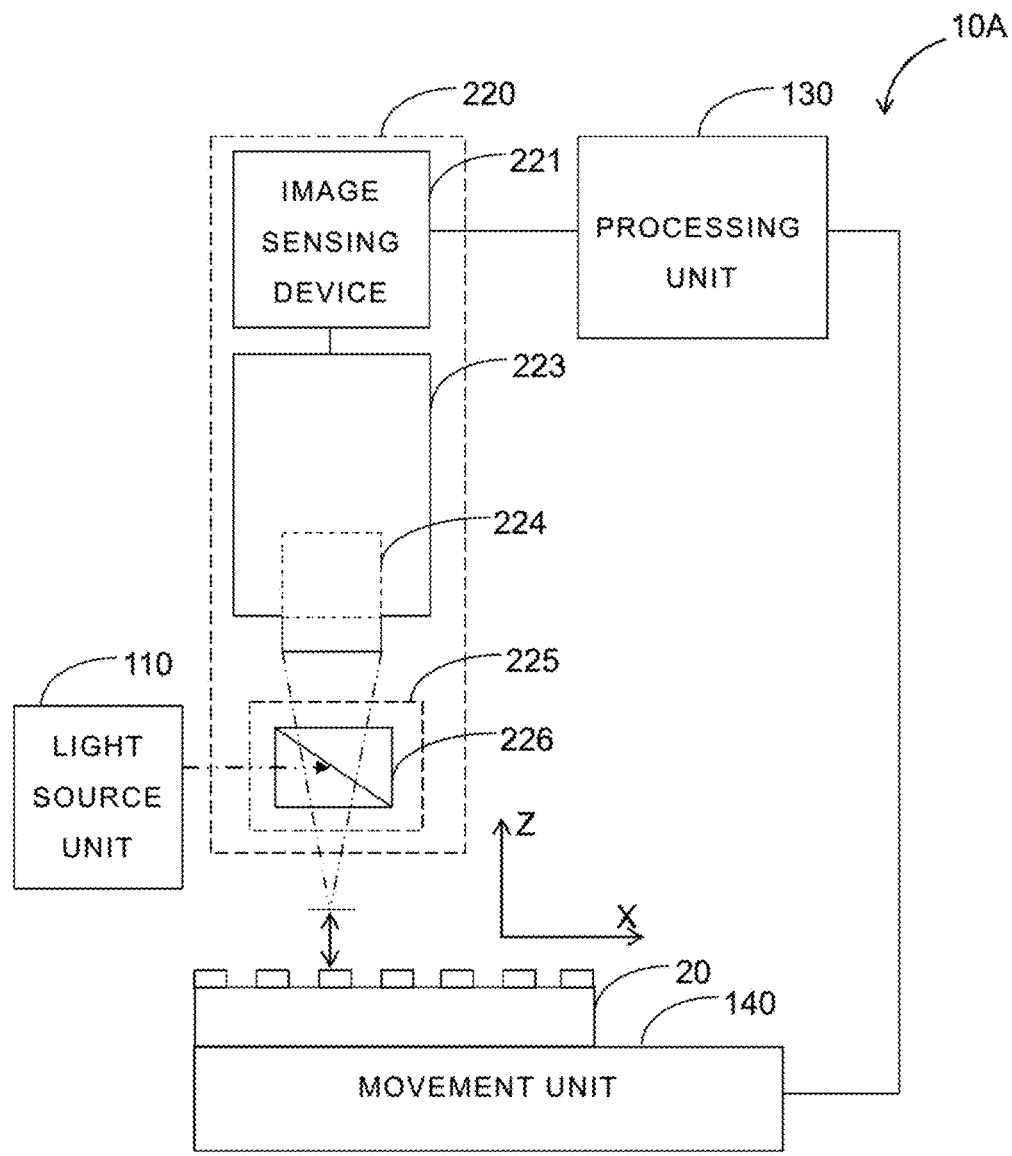
FIG. 2 illustrates an example of the apparatus for measuring pattern of a grating device, according to the first embodiment.

FIG. 2 illustrates an example of the apparatus for measuring pattern of a grating device, according to the first embodiment. In FIG. 2, the apparatus 10A includes the light source unit 110, an image unit 220, the processing unit 130, and the movement unit 140. The light source unit 110 of the apparatus 10A can be any type of light device providing collimated light such as laser or LED with collimating lens. For illustration, the light source unit 110 includes a light source device, a circular polarizing device, a collimating lens, and the light source device in this example is taken as an infrared (IR) LED light source device.

The image unit 220 includes an image sensing device 221, a microscopic device 223, and an optical device 225. The image sensing device 221 includes an image sensor, such as CCD or CMOS image sensor. In addition, the image sensor has a pixel size of less than the pitch of the grating device to be measured, e.g., less than ⅛ of the pitch, and is sensitive to wavelengths of the emitted light (such as the light originating from LED or Laser). The microscopic device 223 is optically coupled to the image sensing device 221 for acquiring digital images (such as still images or videos). The microscopic device 223 is a stereo zoom microscope with magnification of such as 4.5 times or 10 times or even higher, and may be further equipped with an objective lens with magnification of such as 5 times, 10 times, 20 times, and so on. The microscopic device 223 receives beams through the optical device 225. In this example, the optical device 225 includes at least a beam splitter 226, but the invention is not limited thereto.

As illustrated in FIG. 2, the light (such as IR light or light in other wavelength) from the light source unit 110 meets the optical device 225 (e.g., the beam splitter 226) and irradiates to a surface of the grating device 20 perpendicularly and then the reflected light will lead to a Talbot image at a distance of the Talbot length $Z_T$. The image sensing device 221, e.g., with a resolution of 1280×1024 pixels, can be used to observe or acquire the Talbot images (i.e., the repeated self-images) or images due to the Talbot effect. By processing and analysis the acquired digital images due to the Talbot effect, one or more applications can be optionally implemented by the apparatus as shown in FIGS. 1 and 2.

For examples, the first digital images as mentioned above can be utilized to obtain a Talbot carpet, analyze the pattern or quality of the grating device 20, or inspect the pitch or fringes of the grating device 20.

Figure 3:
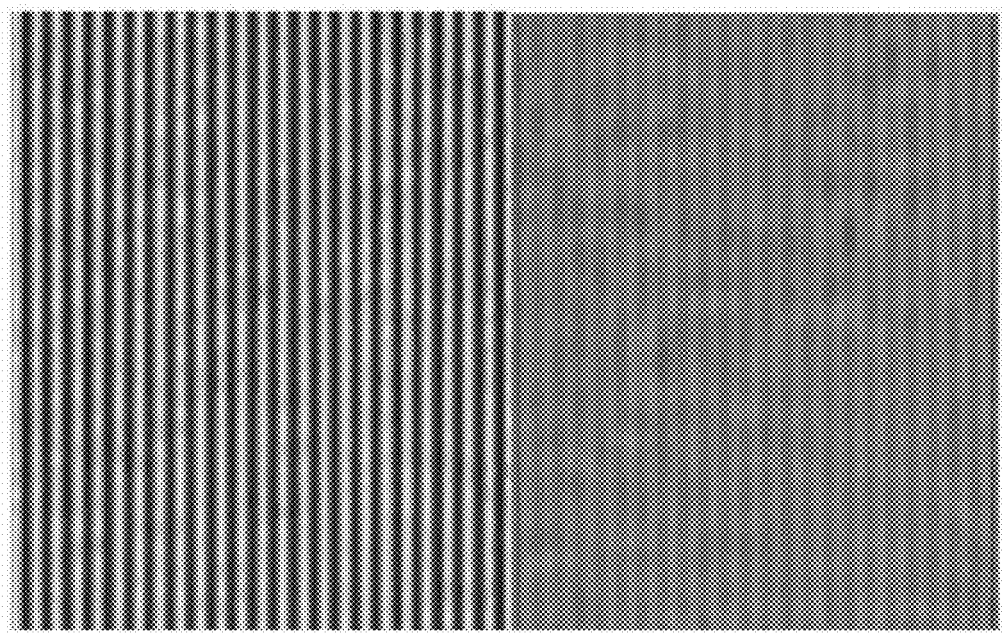
FIG. 3 illustrates an example of an image of a grating device and its Talbot image.

FIG. 3 illustrates an example of an image of a grating device (a sample) and its Talbot image, taken by the apparatus 10A. The half on the left side of FIG. 3 is the image of a grating device 20 (such as a linear scale) and the half on the right side of FIG. 3 is the Talbot image (first self-image) of the grating device. In FIG. 3, the parallel lines in the Talbot image appear to be the same of the parallel lines in the grating sample by same pitch.

Figure 4:
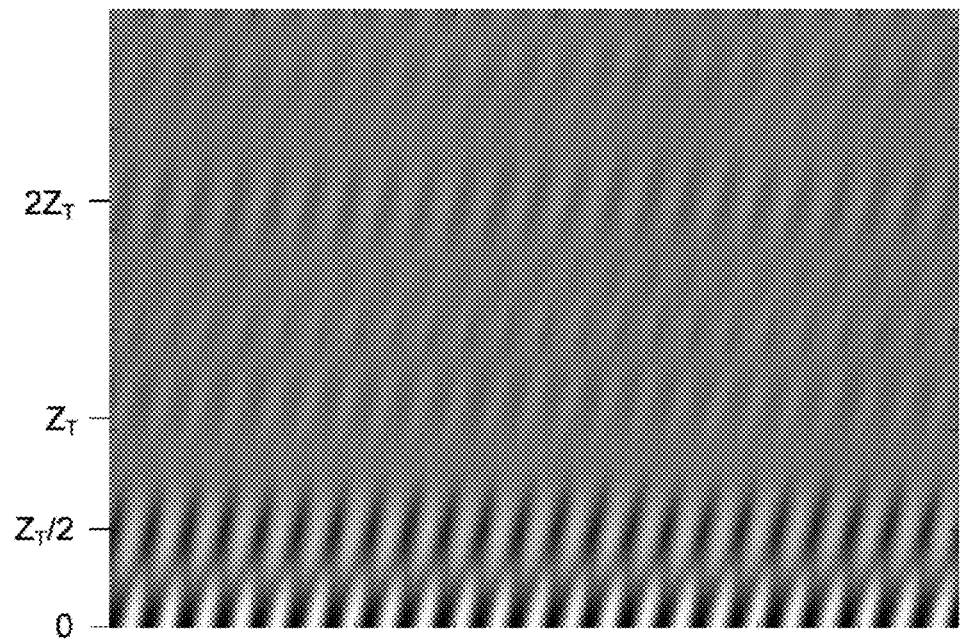
FIG. 4 illustrates a Talbot carpet obtained by using the first digital images acquired according to an example.

FIG. 4 illustrates a Talbot carpet obtained by using the first digital images according to an example. For obtaining the first digital images due to the Talbot effect with respect to the grating device 20, for example, the image unit 220 focuses on the surface of the grating device 20 at first and then the grating device 20 can move away from the image unit 220, i.e. in a direction perpendicular to the surface (e.g., a Z-axis direction as indicated in FIG. 2), in a manner through which the first digital images are acquired associated with positions in the direction perpendicular to the surface. In one example, the grating device 20 is moved away from the image unit 220 in 1 um steps as far as a first position, e.g., 10 mm, from the surface of the grating device 20, thus resulting in 10,000 steps totally. In general, the first position can be determined by the following equation:

$$D = \frac{4p^2}{\lambda}$$

where D denotes a value can be taken as an instance of the first position mentioned above, p is period of the grating device, and $\lambda$ is light wavelength of the light source. In addition, one can also use this equation to estimate a possible range from which a value can be taken as the first position if the period of the grating device to be tested is not exactly known. A first digital image is acquired by the image unit 220 in each of the steps. The first digital images are saved in a memory though the processing unit 130.

Figure 5:
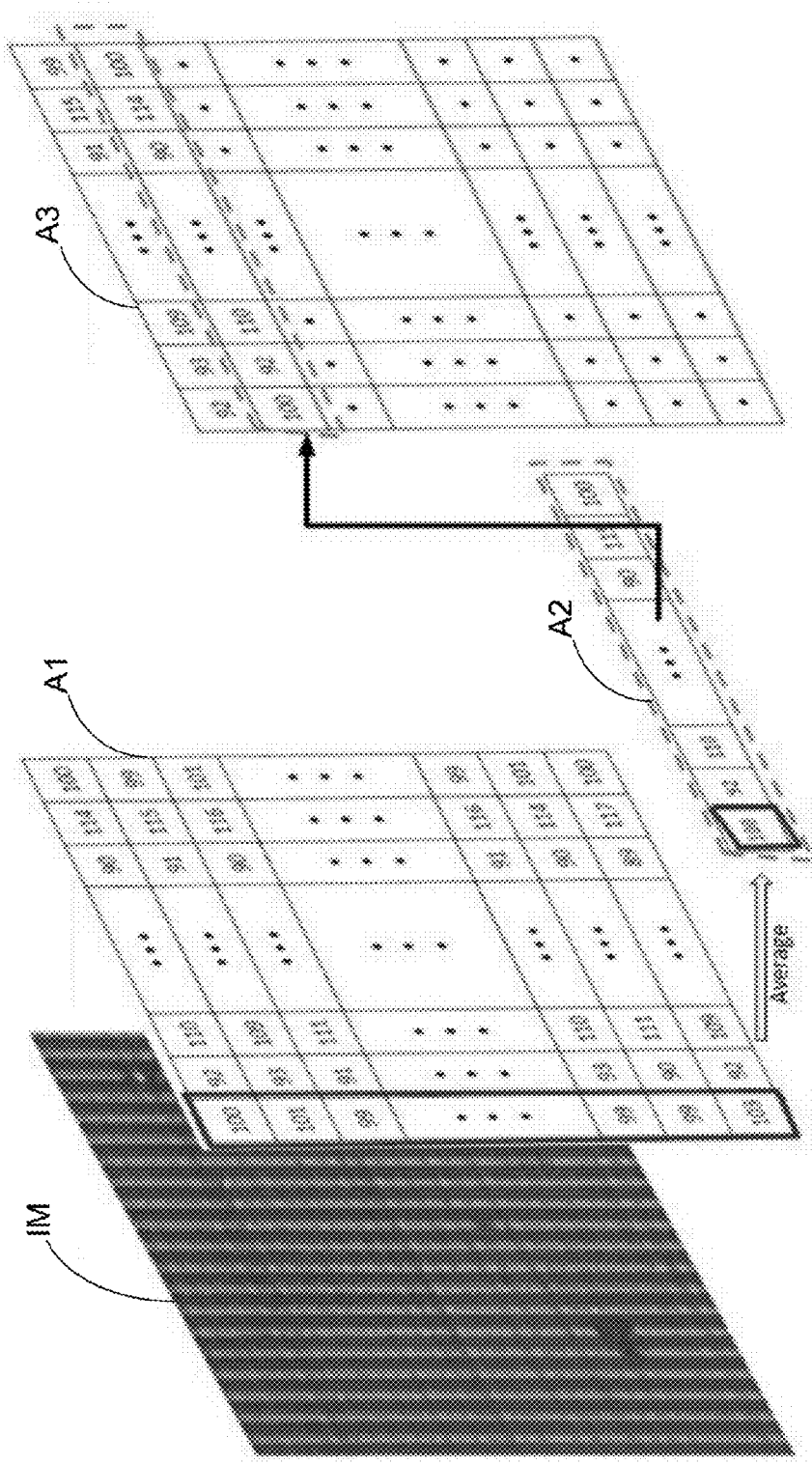
FIG. 5 illustrates a numerical approach to making Talbot carpet as shown in FIG. 4, according to a second embodiment.

FIG. 5 illustrates a numerical approach to making a Talbot carpet as shown in FIG. 4, according to a second embodiment. As illustrated in FIG. 5, each of the first digital images (denoted by IM in FIG. 5) will be represented by a numerical array, namely, array A1 (e.g., 1024×1280 pixels). For each first digital image, the average of each column for its array A1 is put in a linear array A2 (e.g., 1×1024 elements). Thus, each first digital image, i.e., a 2D image, is converted to a one-dimensional array A2.

In addition, all members of the array A2 are put in a row of a new array A3, as shown in FIG. 5. In this way, the number of rows of the array A3 is equal to the number of the first digital images, leading to the array A3 with a size of 10000×1024, in this example. The array A3 indicate image intensity of the Talbot carpet, as shown in FIG. 4, wherein any two adjacent rows of the array A3 correspond to two adjacent first digital images, and the difference between the positions associated with the two adjacent first digital images is the length of the step, such as 1 um in this example.

In some examples, how far from the grating device 20 the first self-image will appear, i.e., the Talbot length, can be determined by some statistical processing based on the first digital images, such as finding local maximum intensity, or maximum amplitude.

In another example, the averages of all member of each image, e.g., first digital images, in the form of the array A1 can be saved numerically as an element of another array A4. All of the first digital images can then result in the array A4, e.g., 10,000×1 elements. The array A4 can be utilized for analysis, comparison, or inspection of the grating device 20.

In the second embodiment, regarding the second digital images as mentioned above, analyzing the pattern or quality of a grating device 20 (such as a sample grating device), or inspecting the pitch or fringes of the grating device 20, or comparison based on the second digital images for the grating device 20 and reference data for a reference grating device, such as a linear scale, can be optionally implemented in the apparatus as indicated in FIG. 1 or 2.

In this embodiment, the image unit 220 focuses on a second position for acquiring the second digital images, wherein the second position is determined based on the first digital images from which the position of the first self-image can be recognized. For example, the second position at a distance of $Z_T/2$ from the surface of the grating device 20 is taken. The second digital images are acquired when the grating device 20 is moved in a direction perpendicular to the fringes of the grating device 20 (e.g., in an X-axis direction as indicated in FIG. 2), in a manner through which the second digital images are acquired associated with positions in the direction perpendicular to the fringes. In an example, the grating device 20 is moved in 1 um steps for a distance of 10 mm in the X-axis direction, thus resulting in 10,000 steps totally, but the invention is not limited thereto. A second digital image is acquired by the image unit 220 in each of the steps. The second digital images are saved in a memory though the processing unit 130.

In this embodiment, when the grating device 20 is being moved in the X direction, the fringes of the grating device 20 will move and then the intensity of light for each pixel sensed by the image unit 220 will change in a sinusoidal manner substantially. For example, the gray values (or color values) of an arbitrary pixel (x1, y1) of the second digital images will vary in that manner, and can be indicated as a characteristic curve corresponding to the pixel (x1, y1). The period of the characteristic curve is equal to the pitch of the fringes of the grating device 20 and the amplitude of the characteristic curve is equal to maximum intensity of light that can pass the grating device 20. Using this characteristic curve, the grating device 20 can be analyzed or inspected elaborately. Since the pitch of the fringes of the grating device 20 corresponds to the period of characteristic curve, the characteristic curve can be indicated in the unit of distance (e.g., 1 um) and is comparable to the results of the grating device 20 or another grating device by an interferometer or another encoder. In an example, the grating device 20 can be measured and calibrated by comparing the characteristic curve for the grating device 20 with reference data (or indicated as a reference curve) obtained by the apparatus in FIG. 1 or 2 for another grating device, e.g., a reference grating device such as a reference scale.

Figure 6:
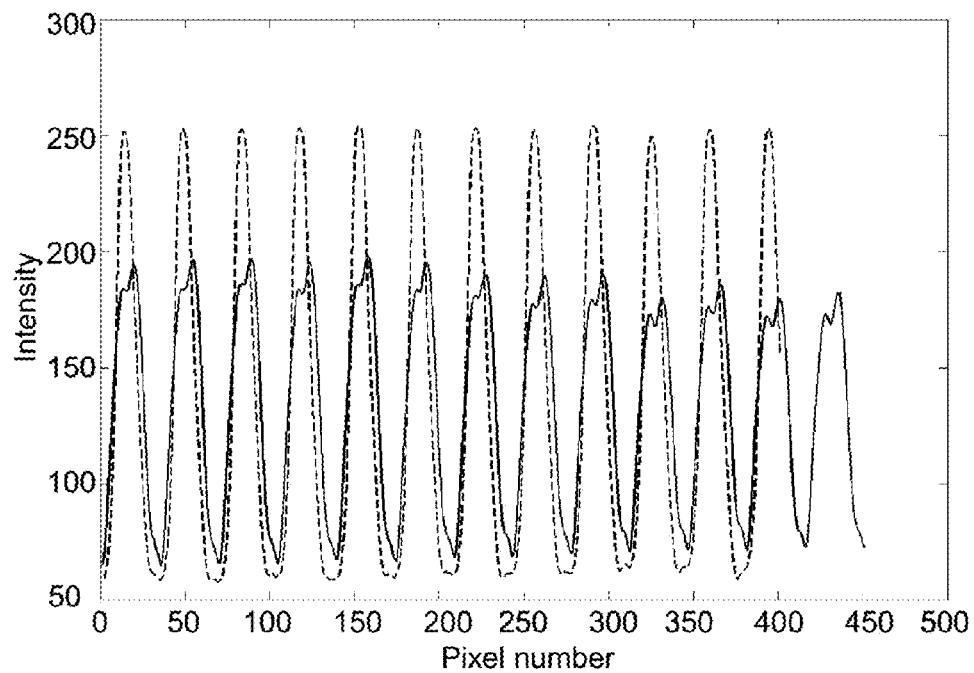
FIGS. 6-7 illustrate examples of comparison based on second digital images for two grating devices.
Figure 7:
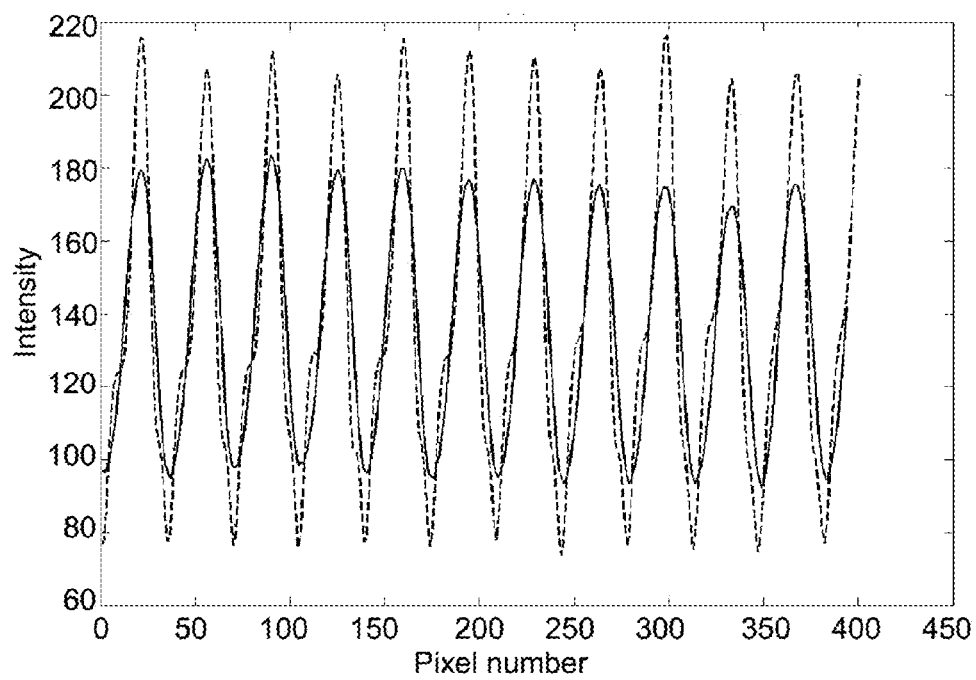

In another example of this embodiment, the second digital images, which can be indicated by a characteristic curve, can be compared with reference data (or indicated as a reference curve) for a reference grating device, such as a linear scale. FIGS. 6-7 illustrate examples of comparison based on second digital images, wherein the solid curve indicates a grating device G1 and the dotted curve indicates another grating device G2. In FIG. 6, the two characteristic curves are determined by second digital images on the surface (i.e., Z=0) of the grating device G1 and grating device G2, respectively, using the apparatus in FIG. 2. In FIG. 7, the two curve are determined by the second digital images above the surface, e.g., Z=500 um, of the grating device G1 and grating device G2, respectively, using the apparatus in FIG. 2. As illustrated in FIG. 6 or 7, the two characteristic curves have the same period, i.e., the same pitch of fringes, and the pattern of the fringes of the two grating devices can be compared and inspected. In addition, the quality of linear scale can be verified by uniformity and matching of these two characteristic curves.

Figure 8:
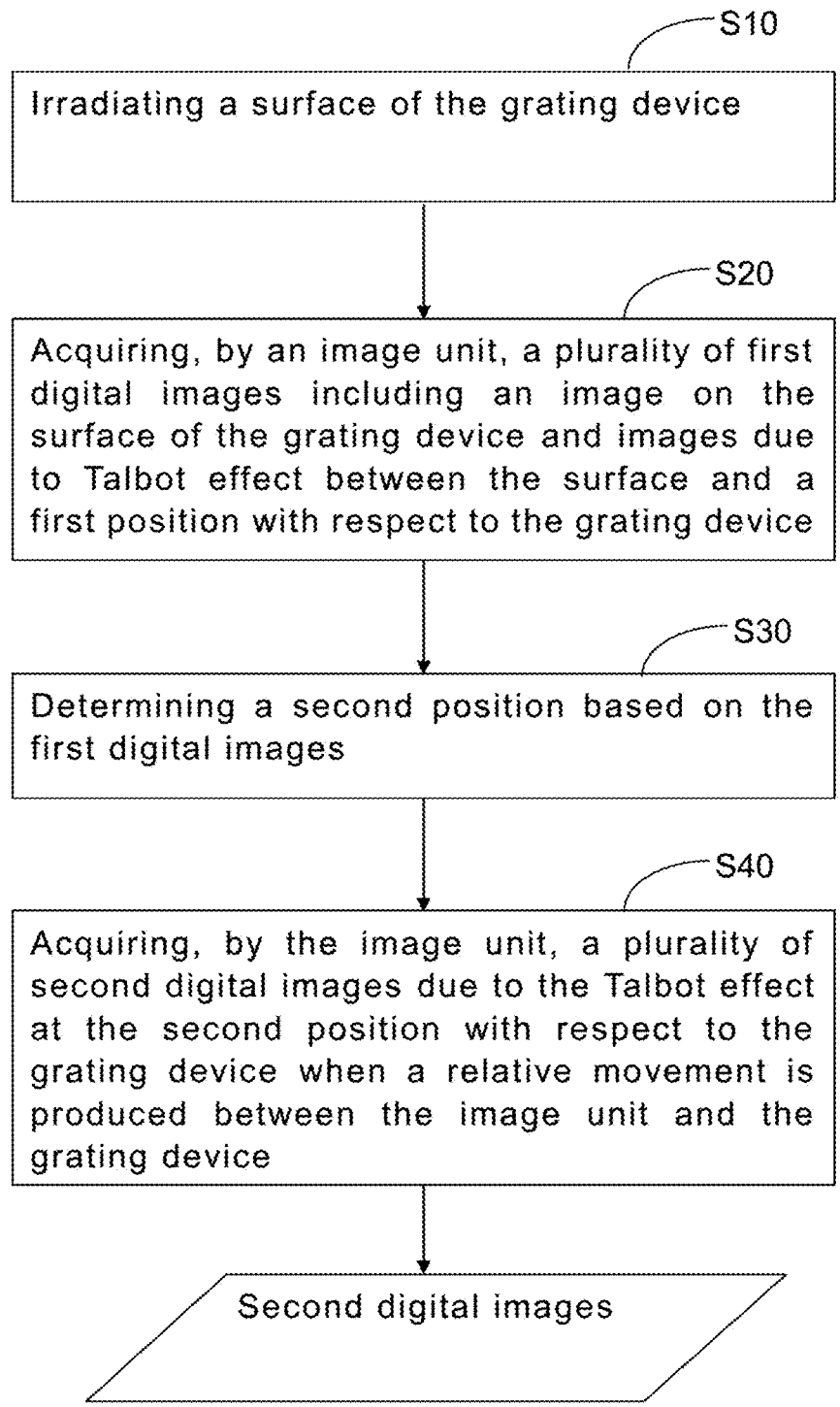
FIG. 8 illustrates a method for measuring pattern of a grating device, according to a third embodiment.

FIG. 8 illustrates a method for measuring pattern of a grating device, according to a third embodiment. As shown in FIG. 8, the method includes the following steps. In step S10, a beam is irradiated to a surface of the grating device. In step S20, a plurality of first digital images including an image on the surface of the grating device and images due to Talbot effect between the surface and a first position with respect to the grating device are acquired by an image unit. In step S30, a second position is determined based on the first digital images. In step S40, a plurality of second digital images due to the Talbot effect at the second position with respect to the grating device are acquired by the image unit when a relative movement is produced between the image unit and the grating device.

Based on the second acquired images, inspection of the grating device, or comparison of the grating device with a reference grating scale, can be optionally implemented. The following provides some examples of this embodiment. The method according to the embodiment above can be implemented by way of the apparatus as shown in FIG. 1 or 2.

In an example of the embodiment, in step 40, the relative movement is produced in a direction perpendicular to fringes of the grating device in order to acquire the second digital images by the image unit.

In another example, in step S40, the relative movement in the direction perpendicular to fringes of the grating device includes a movement at a first constant speed, and the image unit acquires the second digital images at a first frame rate when the movement at the first constant speed is produced.

In an example of step S20, the step of acquiring the first digital images includes: acquiring, by the image unit, the first digital images due to the Talbot effect from the surface of the grating device to the first position with respect to the grating device, or from the first position to the surface of the grating device, when a relative movement is produced between the image unit and the grating device in a direction perpendicular to the surface of the grating device.

In another example of step S20, wherein the step of acquiring the first digital images includes: acquiring, by the image unit, the image on the surface of the grating device and the images due to the Talbot effect between the surface and the first position with respect to the grating device when focusing from the surface of the grating device to the first position, or from the first position to the surface of the grating device.

In another example, in step S20, a relative movement between the image unit and the grating device is produced in a direction perpendicular to the surface of the grating device. In an example, the relative movement perpendicular to the surface includes a movement at a constant speed, and the image unit acquires the first digital images at a frame rate when the movement at the constant speed is produced.

In an example of this embodiment, the method can further include: generating comparison information based on the second digital images and reference data. In an example, the method can further include: presenting the comparison information graphically or numerically.

Figure 9:
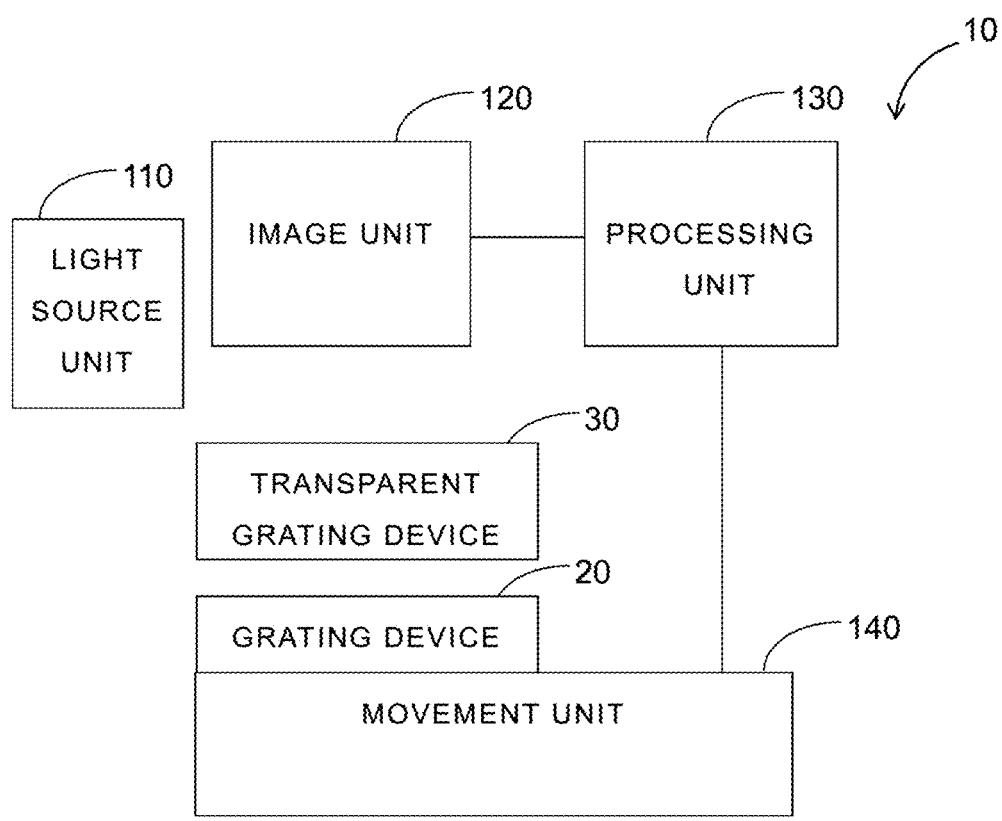
FIG. 9 illustrates an apparatus for measuring pattern of a grating device, according to a fourth embodiment.

According to a fourth embodiment of the invention, a method to improve the quality of the images (such as the first digital images) is provided, wherein a transparent grating device (or called a second grating device) is additionally disposed between the light source unit and the grating device to be measured (or called a first grating device). FIG. 9 illustrates an apparatus for measuring pattern of a grating device, according to the fourth embodiment. In FIG. 9, a transparent grating device 30 (or called a second grating device) is disposed above the grating device 20 (or called a first grating device) and has the pitch substantially equal to that of the grating device 20.

Figure 10:
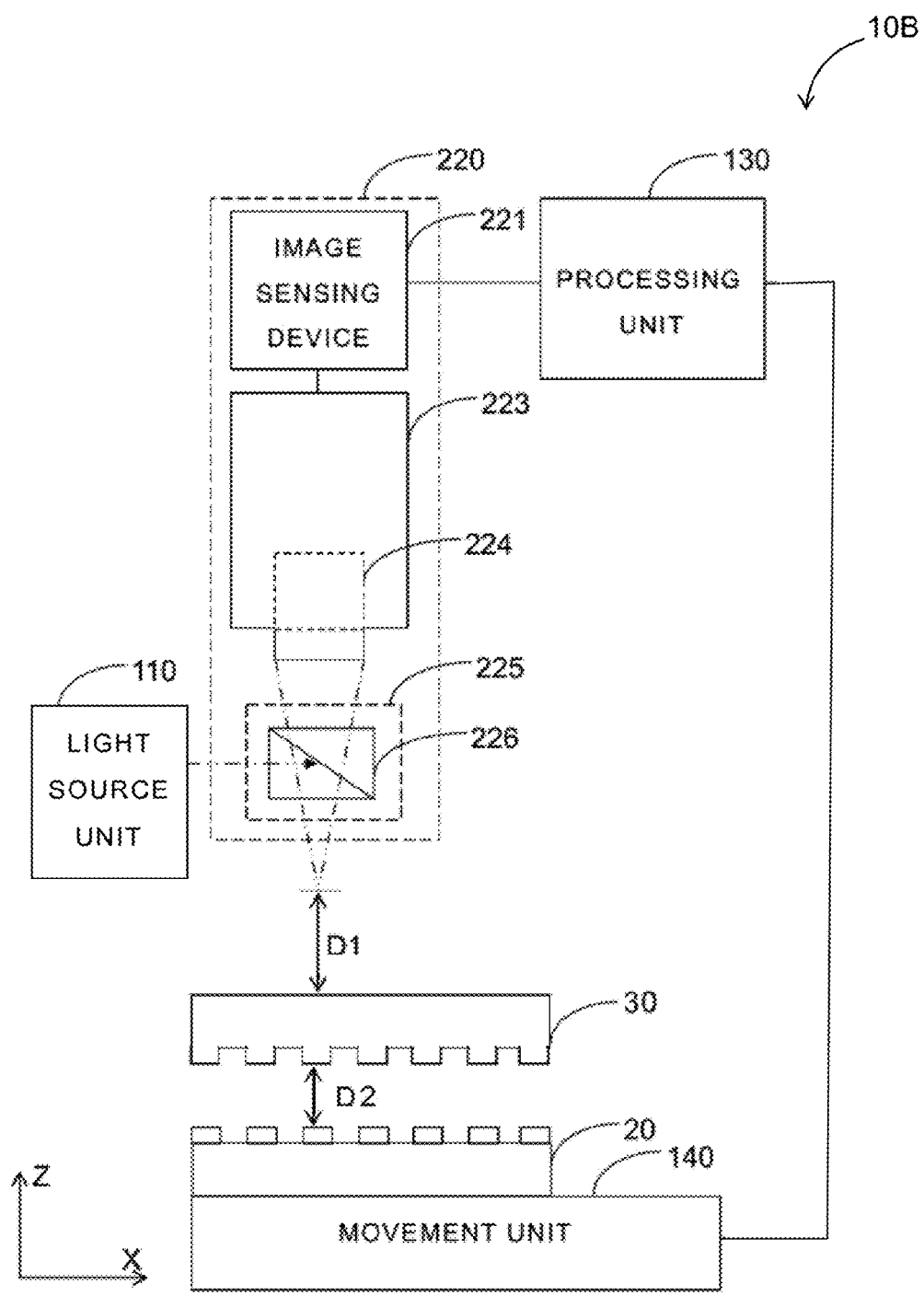
FIG. 10 illustrates an example of the apparatus for measuring pattern of a grating device, according to the fourth embodiment.

FIG. 10 illustrates an example of the apparatus for measuring pattern of a grating device, according to the fourth embodiment. In FIG. 10, the apparatus 10B can be regarded as an improvement of that shown in FIG. 2, and the transparent grating device 30 is disposed above the grating device 20 for a distance D2 (D2>0), e.g., supported by a support mechanism such as a frame, or disposed on the grating device 20, and the image unit 220 focuses on a position that is a distance D1 from the transparent grating device 30. The first digital images can be acquired by the image unit 220 of the apparatus 10B, as exemplified in the above examples for making the Talbot carpet or determining Talbot length or the second position. In addition, since the transparent grating device 30 is disposed for the sake of acquiring the first digital images, the transparent grating device 30 will not move during the acquisition of the second digital images.

With reference to the fourth embodiment, the method as illustrated in FIG. 8 can further include the following steps. A beam from the light source unit passes through a transparent grating device to a surface of the grating device to be measured. The beam irradiates to the grating device and then reflected to the transparent grating device so that the image unit can acquire a plurality of first digital images.

Figure 11:
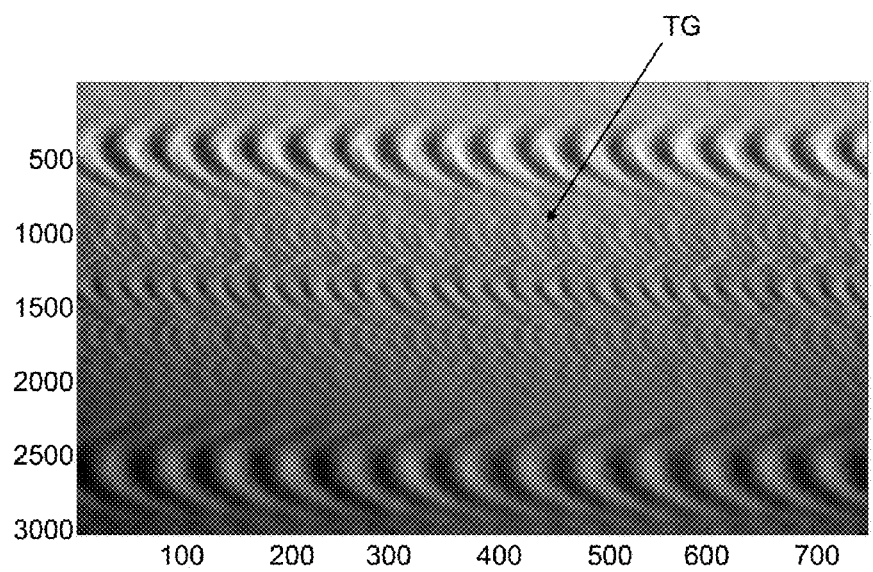
FIG. 11 illustrates a Talbot carpet when the grating distance is equal to the first position.
Figure 12:
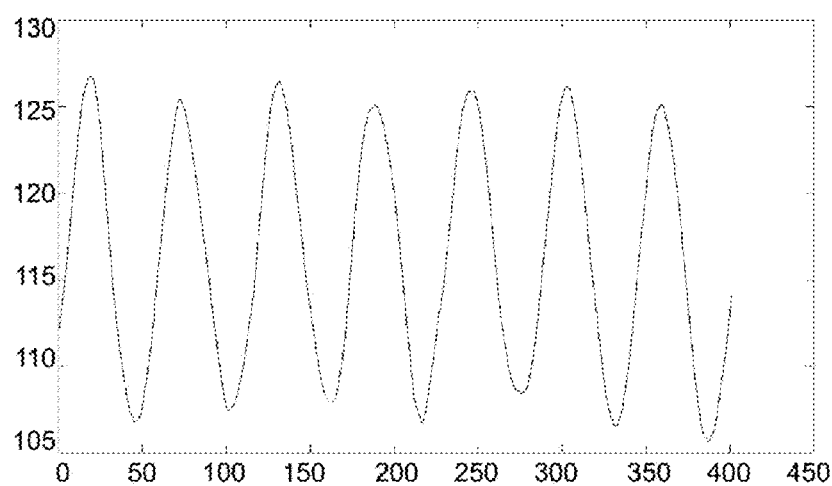
FIG. 12 illustrates an example of an improved curve compared to FIG. 7.

FIG. 11 illustrates a Talbot carpet when the grating distance for a grating device is equal to the first position. In FIG. 11, a position TP illustrates a position where the image corresponds to a transparent grating device. FIG. 12 illustrates an example of an improved curve compared to FIG. 7. The curve is improved to be clearer, as compared to FIG. 7.

Moreover, all the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

What is claimed is:

1. An apparatus for measuring pattern of a grating device, the apparatus comprising:
    a light source unit to irradiate to a surface of the grating device;
    an image unit for acquiring images with respect to the grating device, the image unit comprising:
    an image sensing device;
    a microscopic device, optically coupled to the image sensing device; and
    an optical device comprising a beam splitter, wherein the microscopic device receives beams through the optical device;
    a processing unit, coupled to the image unit, for controlling the image unit to acquire the images; and
    a movement unit for producing relative movements between the image unit and the grating device;
    wherein the image unit acquires a plurality of first digital images including an image on the surface of the grating device and images due to Talbot effect between the surface and a first position with respect to the grating device; the processing unit determines a second position based on the first digital images; the image unit acquires a plurality of second digital images due to the Talbot effect at the second position with respect to the grating device when the movement unit produces a relative movement between the image unit and the grating device;
    the image unit acquires the first digital images due to the Talbot effect with respect to the grating device when the image unit focuses on the surface of the grating device and while the image unit focuses on a plurality of different positions which are away from the surface and between the surface and the first position;
    the movement unit produces the relative movement in a direction perpendicular to fringes of the grating device in order for the image unit to acquire the second digital images.

2. The apparatus according to claim 1, wherein the processing unit further generates comparison information based on the second digital images and reference data.

3. The apparatus according to claim 2, further comprising:
    a display unit, coupled to the processing unit, for presenting the comparison information graphically or numerically.

4. The apparatus according to claim 1, wherein a transparent grating device is disposed between the grating device and the light source unit.

5. The apparatus according to claim 1, wherein the relative movement in the direction perpendicular to fringes of the grating device includes a movement at a first constant speed, and the image unit acquires the second digital images at a first frame rate when the movement unit produces the movement at the first constant speed.

6. The apparatus according to claim 1, wherein the movement unit produces a relative movement between the image unit and the grating device in a direction perpendicular to the surface of the grating device in order for the image unit to acquire the first digital images.

7. The apparatus according to claim 1, wherein the light source unit includes a light source device, a circular polarizing device, and a collimating lens.

8. The apparatus according to claim 7, wherein the light source device includes a light emitting device or a laser device.

9. A method for measuring pattern of a grating device, the method comprising:
    irradiating to a surface of the grating device;
    acquiring, by an image unit, a plurality of first digital images including an image on the surface of the grating device and images due to Talbot effect between the surface and a first position with respect to the grating device;
    determining a second position based on the first digital images;
    acquiring, by the image unit, a plurality of second digital images due to the Talbot effect at the second position with respect to the grating device when a relative movement is produced between the image unit and the grating device;
    wherein the relative movement is produced in a direction perpendicular to fringes of the grating device in order to acquire the second digital images by the image unit;
    the image unit acquires the first digital images due to the Talbot effect with respect to the grating device when the image unit focuses on the surface of the grating device and between the surface and the first position.

10. The method according to claim 9, wherein the relative movement in the direction perpendicular to fringes of the grating device includes a movement at a first constant speed, and the image unit acquires the second digital images at a first frame rate when the movement at the first constant speed is produced.

11. The method according to claim 9, wherein the step of acquiring the first digital images comprises:
    acquiring, by the image unit, the image on the surface of the grating device and the images due to the Talbot effect between the surface of the grating device and the first position with respect to the grating device when a relative movement is produced between the image unit and the grating device in a direction perpendicular to the surface of the grating device.

12. The method according to claim 9, further comprising:
    generating comparison information based on the second digital images and reference data.

13. The method according to claim 12, further comprising:
   presenting the comparison information graphically or numerically.

\* \* \* \* \*